Nov. 30, 1954    J M. SUMMERS    2,695,803
LATCH FASTENER
Filed Dec. 12, 1951    3 Sheets-Sheet 1
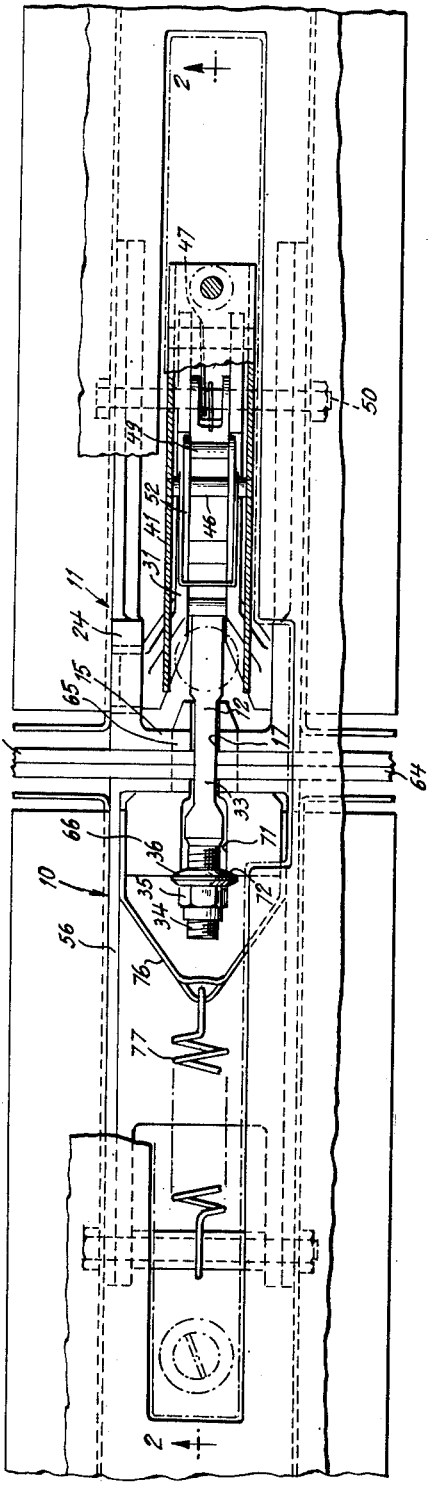
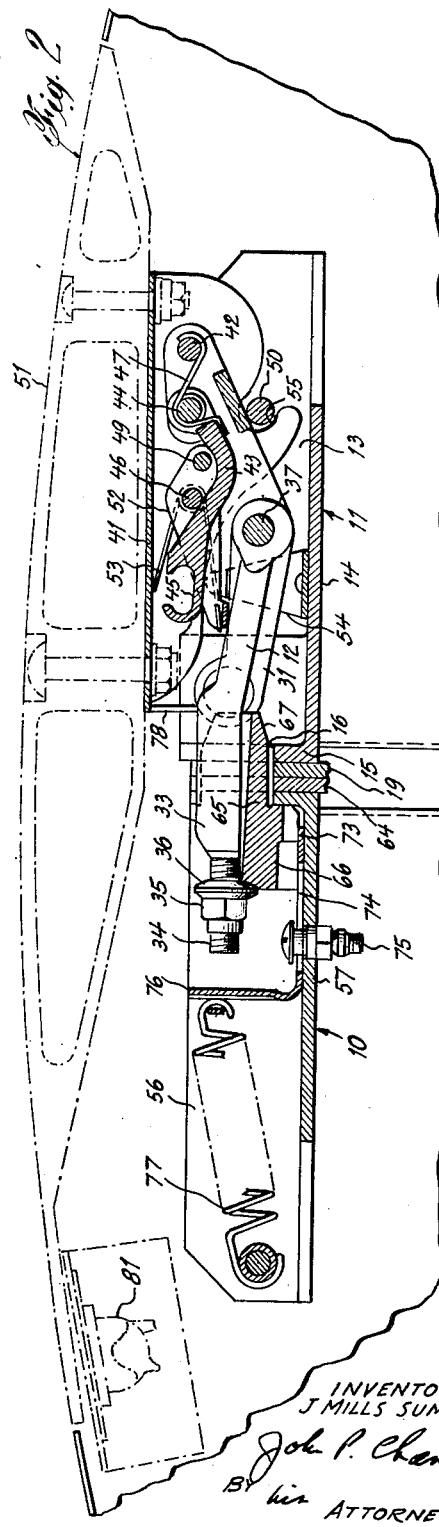
INVENTOR
J MILLS SUMMERS
By John P. Chandler
his ATTORNEY Nov. 30, 1954  J M. SUMMERS  2,695,803
LATCH FASTENER
Filed Dec. 12, 1951  3 Sheets-Sheet 2
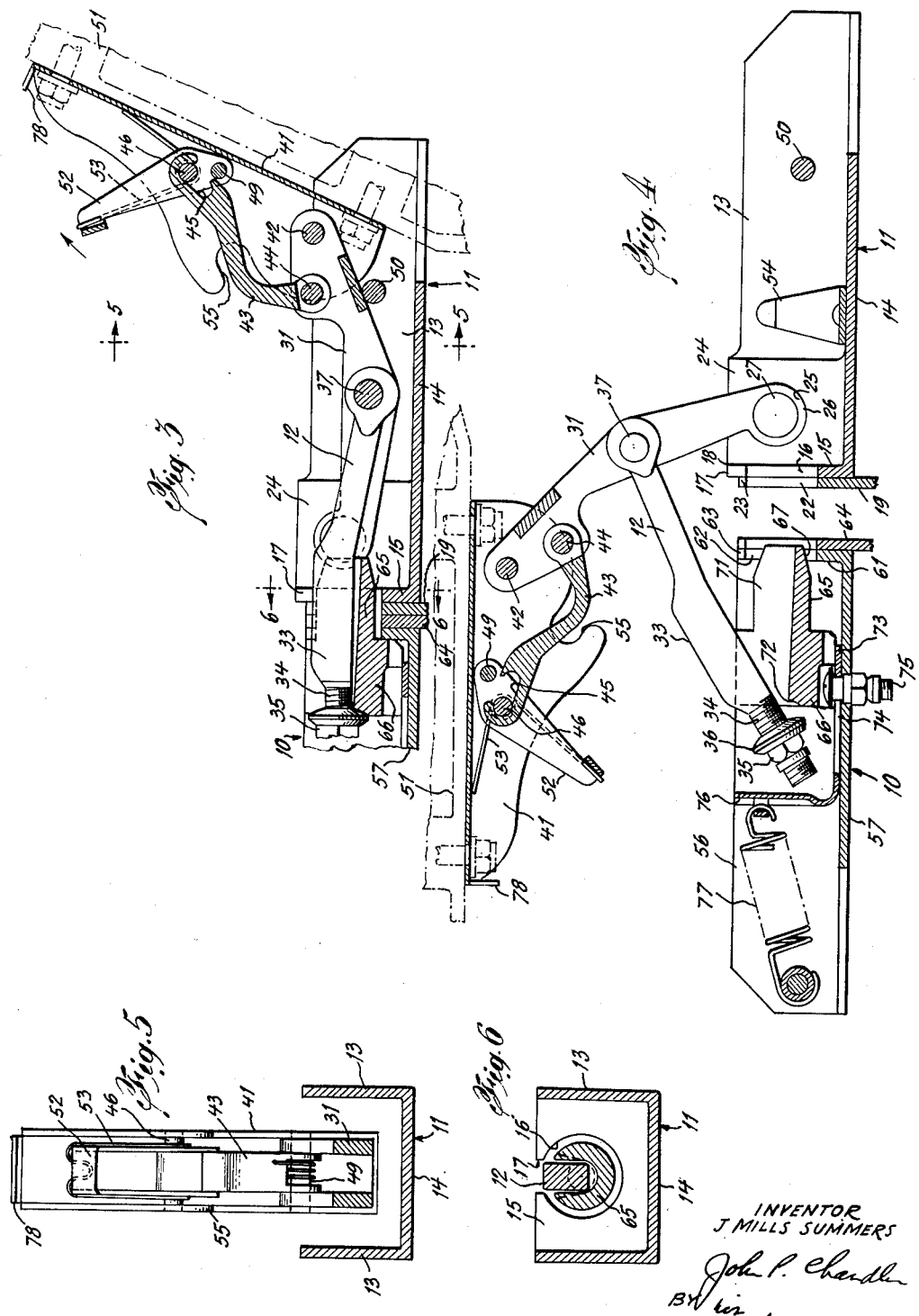
INVENTOR
J MILLS SUMMERS
BY John P. Chandler
ATTORNEY

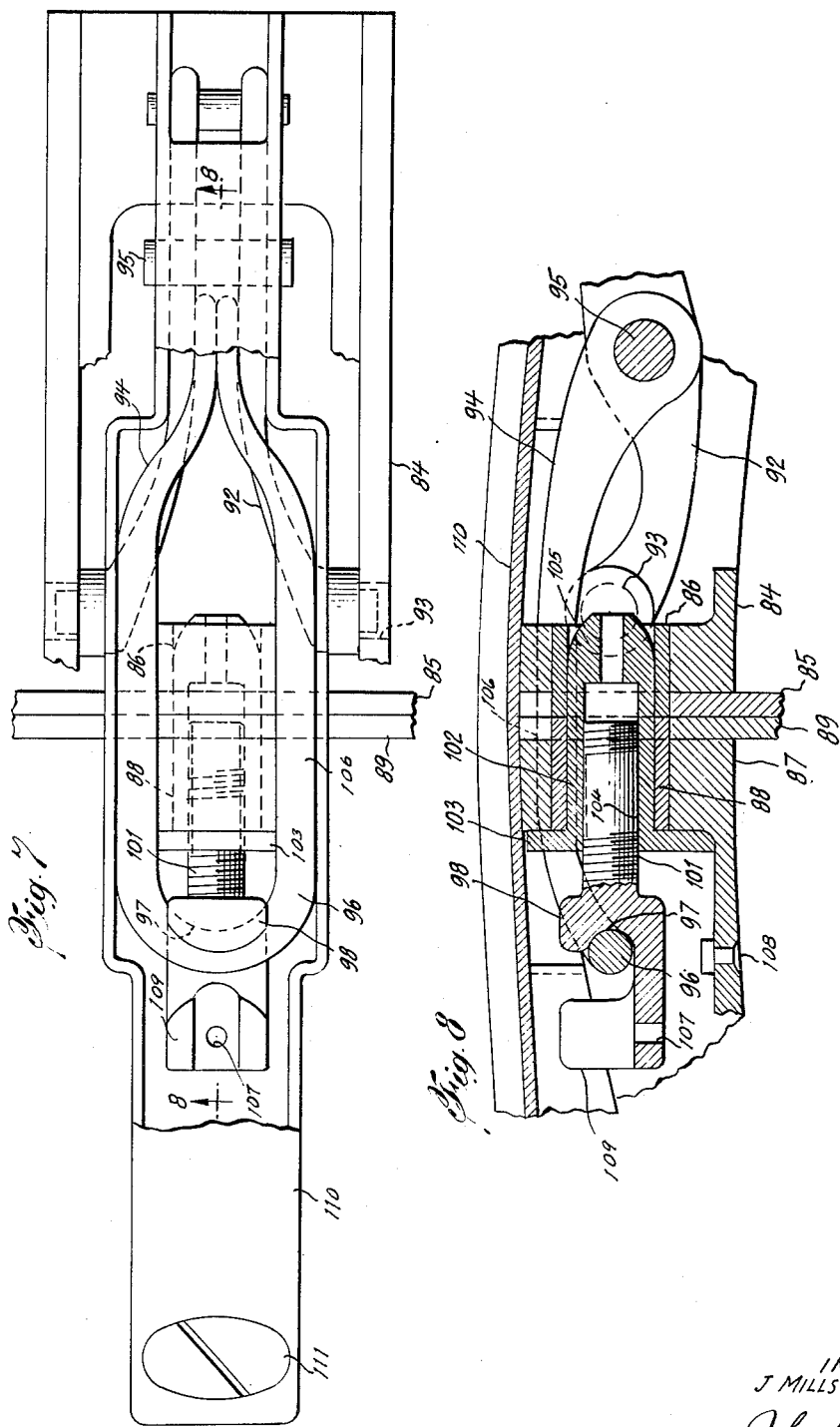

United States Patent Office 2,695,803
Patented Nov. 30, 1954

2,695,803

LATCH FASTENER

J Mills Summers, Englewood, N. J.

Application December 12, 1951, Serial No. 261,233

3 Claims. (Cl. 292—113)

This invention relates to new and useful improvements in heavy duty latch fasteners and relates more particularly to a novel fastening instrumentality for drawing together and securing plural bodies in flush or in substantially flush relation and for insuring against relative movement of the bodies, such as panels or plates, under the action of forces tending to separate the panels or to move them relative to each other with a shearing action.

An important object of the present invention is to provide a novel latch fastener designed primarily although not exclusively for securing airplane cowlings and closures for access openings in aircraft and which has improved structural and performance characteristics.

A better appreciation of the unique features of the novel latch fastener of the present invention will be gained by briefly noting some of the many shortcomings of fasteners of the prior art which do not meet the practical requirements of performance to be found in the present fastener. Firstly, present latches generally require piecemeal assembly to the structure instead of unit attachment of complete assemblies. Secondly, they are not adaptable to various radii or curvatures of the surfaces of removable panels. They generally have little or no provision for aligning one member of the fastener with the other nor do they provide for overcoming excessive friction due to misalignment of the two members of the fastener or misalignment of the two members of the fastener with the usual shear pins. They are often incapable of absorbing shear loads in all directions as well as the heavy tension loads which they are called upon to take. Moreover, existing latches are incapable of reaching out to engage the mating part where the two bodies are initially beyond normal distances apart just prior to latching. Finally, their designs necessitate excessive weight of structure to absorb the tension, shear and bending moments to be found in a latched structure.

The fastener of the present invention overcomes all of the foregoing objections and deficiencies. The arrangement is such that each fastener comes fully assembled in two mutually cooperating units, one for securement to each of the bodies. The same unit may be used where the two panels lie in a flat plane or where the panels have varying degrees of curvature. The only structural change is in the contour of the handle element which also serves as a closure for the fastener and the handle is shaped to conform with this outer contour, flat or curved. The latch element which reaches out to the latch receiving element has means for exerting very considerable leverage on the parts to draw them together with only a modest amount of exertion by the operator. A distinctly novel shear pin which is wholly retractable into the latter element readily aligns the parts. Also, when the parts are fully locked and the shear pin is extended it absorbs shear loads in all directions. Thus, no shear pin is protruding from one of the units to obstruct closing movement if one of the bodies is in place and the other is moved toward the former in the manner of a door closing on its hinges. Moreover, accidental unlatching is a virtual impossibility since the combined closure and handle, earlier mentioned, is provided with a final lock against which there is little pressure and the lock cannot become unfastened short of positive manipulation. More important still, the parts cannot be moved to partly locked position without such fact being obvious from a cursory examination since in such position the handle must of necessity stand outwardly substantially at right angles to the surface of the bodies where it acts as a flag to show the unlocked position.

The latch is light in weight and requires an exceedingly small space, especially when considering its excellent performance characteristics.

The shear-force resisting means comprises a shear pin which when in unlocked position retracts wholly within one element of the fastener assembly and which is drawn outwardly when it is engaged by a draw bolt operated by a primary lever associated with the other element of the assembly, at which time it enters an opening in the latter or in attached shear plates in snug-fit relation. The shear pin is formed with a tapered nose which aids it in aligning itself with the opening and if there is any substantial misalignment between the parts this tapered member acts as a finding and aligning pin, and after the parts are locked it acts solely as a highly effective shear pin, resisting shearing forces in all directions in the plane of the shear plate.

The shear pin assembly is mounted for sliding movement in a cage housing in one element of the two-part latch fastener structure and a draw bolt is connected substantially midway between the ends of a primary lever pivoted at one end in a cage or housing for the other part of the assembly and which has a toggle action for locking purposes. This lever is assisted by a folding extension lever which when in folded position has locking hooks which opsitively resist any forces tending to unlock the latch.

In the drawings:

Fig. 1 is a top plan view of a fastener embodying the present invention with certain cover sections broken away to show the internal parts of the device and showing the parts in locked relation;

Fig. 2 is a broken section taken on line 2—2 of Fig. 1;

Fig. 3 is a broken longitudinal section showing the draw bolt in the looked relation but the cover section in open position;

Fig. 4 is a broken section showing the relation of the parts as the draw bolt is about to be inserted in the detent;

Fig. 5 is a section taken on line 5—5 of Fig. 3;

Fig. 6 is a section taken on line 6—6 of Fig. 3;

Fig. 7 is a broken plan view showing a modified form of the present invention;

Fig. 8 is a broken section taken on line 8—8 of Fig. 7.

The latch fastener of the present invention includes two channel-shaped frames or cages 10 and 11, the latter having a draw bolt 12 and the former having a slidable assembly including a detent for receiving the outer end of the draw bolt and a retractable shear pin which is wholly received in cage 10 when the parts are unlocked but which is movable into cage 11 when the latch is in locked relation. For convenience in description the frames will be referred to as the draw bolt cage and the shear pin cage.

If the fastener is used on an access opening the shear pin cage is usually attached to the fixed part of the structure and the draw bolt cage to the movable member such as the closure plate. In two, three or four part cowlings for an aircraft engine there is no such distinction.

The draw bolt cage 11 has opposed side walls 13, a base wall 14, a front wall 15 having a central opening 16 therein for the shear pin and also having a slot 17 of less width than the diameter of the opening leading from the upper edge 18 to such opening. A shear plate 19 is secured by suitable means not shown to the structure and has an opening 22 and slot 23 registering with opening 16 and slot 17, respectively.

The front ends of side walls 13 are of increased thickness as shown at 24 and such thickened sections have aligned openings 25 carrying bearing bushings 26 which receive trunnions 27 formed at one end of a bifurcated lever 31 which operates with a toggle action on the draw bolt and will sometimes be referred to as the draw bolt lever. A draw bolt 12 has a central, upwardly offset portion 33 for a purpose to be described and a threaded section 34 at one end which carries an abutment such as a nut 35 having some kind of locking means such as a fiber washer to restrict free rotation. The nut also has a spherical inner surface as shown at 36.

The other end of the bolt is mounted on pivot pin 37 between the legs of the lever.

The lever and the draw bolt should be of sturdy construction because they are the principal working parts. An assisting or hand lever 41 is of channelled construction and may be stamped from sheet metal. It is pivoted at 42 at the free end of the primary lever. Between pivots 42 and 37 a pawl 43 is pivoted at 44. This pawl is provided with a substantially C-shaped recess 45 at its outer end which receives a pin 46 mounted in the channel of lever 41. A spring 47 urges the free end of the pawl into contact with pin 46, thus causing the pin to enter the C shaped recess.

When in this position hand lever 41 forms an angular extension of the draw bolt lever 31 and being disposed at more than 90° thereto and is locked thereto for conjoint movement in either direction by pawl 43 to facilitate opening and closing of the latch fastener. Handle 51 carried by lever 41 has several purposes, one of which is to increase the effective length of the latter. It also serves as a cover or closure for the fastener structure.

The pawl may be released from its locked position relative to pin 46 by a release lever 52 also carried by pin 46. A pin 49 carried by the release lever pushes the pawl out of engagement with pin 46. A spring 53 returns the release lever after release of the pawl has been effected.

If the installation is such that the open or top side of the cage of Fig. 2 faces downwardly, it is desirable to retain the draw bolt lever within the cage and this is accomplished by means of a spring clip 54. The side walls of the cage have several openings for mounting the cage to the structure and it also has one cross pin 50 for the same purpose which also serves the second purpose of receiving thereunder hook shaped elements 55 formed on the hand lever for securing both levers against outward movement to unlocked position so long as the cover is maintained closed, as will be described.

The shear pin cage 10 has side walls 56, a bottom wall 57 and a front wall 61 having a central opening 62 and a slot 63 leading downwardly from its upper edge to the opening. A shear plate 64 similar to shear plate 19 has an opening and slot aligned with opening 62—63. These shear plates, although in contact with the cages, are not necessarily attached thereto but rather to the structure. They may of course also be welded to the cages and considered for the purpose of the specification and in the appended claims to be a part of the fastener structure. It will be apparent, however, that the front walls 15 of cage 11 and 61 of cage 10 with their aligned openings 16 and 62 are themselves essentially shear plates since they take up shear loads.

A sliding assembly may be formed in one piece and includes a retractable shear pin 65 carried by a block 66. The shear pin has a tapered nose 67 to facilitate entering into and through the shear plate in the other cage in the event of misalignment. It also has a longitudinal slot 71 whose inner end has a spherical surface 72 to receive the spherical surface 36 of nut 35. A base wall 73 has a slot 74 through which a limit pin 75 passes into the lower wall 57. A tail piece 76 serves as an abutment against which the free end of the draw bolt may act in case the shear pin does not easily retract. A spring 77 urges the shear pin assembly to retracted position and retains it in such position. If, due to misalignment, the shear pin does not readily retract into its cage the hand lever is moved to the left, thereby causing the free end of the draw bolt to push against tail piece 76.

An angle bracket 78 has the useful purpose of preventing closing of the handle if the abutment or nut 35 is not properly positioned within detent 72 or if the draw bolt has not fully moved to its past-center position. If either of these situations should occur, then the central section of the draw bolt will project upwardly above its intended position in recess 71 and bracket 78 is of such length that it just contacts the draw bolt when the latter is properly locked and if such is not the case the hand lever cannot go down far enough to permit handle 51 to be locked at 81.

The operation of the device is as follows. When the members to be latched together are in unlocked relation there is oftentimes a space between them as shown in Fig. 4. The draw bolt is placed over the inner end of the sliding assembly so that the inner spherical surface 36 of nut 35 enters the spherical recess 72 of the block. The draw bolt is then moved to the right by manipulating handle 51 which is keyed to the draw bolt lever through the medium of pawl 43. This action draws the sliding assembly including the retractable shear pin and causing the main or cylindrical portion thereof to enter opening 22—16 in the draw bolt cage. Nut 35 has been adjusted to a position relative to the threaded section of the draw bolt to cause the forward face of block 66 to engage the rear face of front wall 61 of cage 10 as pivot 37 passes center on its downward travel. During this movement the upwardly offset portion 33 of the draw bolt moves into recess 71 of the retractable shear pin and the primary lever comes to rest when it engages cross pin 50 which acts as a stop. The distance past center which the draw bolt lever is permitted to travel is important since this determines the extent of relaxing of the latching action. Release lever 52 is now moved in the direction of the arrow shown in Fig. 3, thus causing roller 49 to push the pawl away from the pin 46 and permitting the secondary lever to be moved downwardly to its lowermost position at which time ears 55 have moved under cross pin 50.

As was pointed out earlier the combined handle and cover member 51 which gives greater leverage to the handle lever is now in the position shown in broken lines in Fig. 2 and a fastener 81 is manipulated to hold the cover member in its closed position. Because of the toggle action of draw bar 12 and primary lever 31 no unlocking movement of these parts can occur so long as the draw bolt lever is in its lowermost position. It is held in this position so long as hook shaped elements 55 underlie pin 50. Any stresses tending to raise the hand lever are exceedingly light and it is for this reason that fastener 81 need be only of light tensile strength. In the event that fastener 81 for any reason becomes unfastened or has not been securely fastened spring 47 opens the cover and the secondary lever which acts as a warning flag showing that the fastener is not fully closed.

In the modified form of the invention shown in Figs. 7 and 8 a somewhat different type of retractable shear pin assembly is provided and the draw bolt also is modified. The draw bolt cage 84 has a shear plate 85 and in this instance a bushing 86 extends through aligned openings in the cage and in the shear plate. Cage 87 similarly has a bushing 88 extending through the opening in the shear plate 89. The primary or draw bolt lever 92 is journaled at 93 and the draw bolt 94 is pivoted to the primary lever on pin 95. The primary lever is again of bifurcated construction and the draw bolt 94 is mounted between the legs thereof.

The draw bolt in this instance is of bifurcated construction. A loop 96 at its outer or free end is received within an arcuate recess 97 in a head 98 which is formed at the outer end of a screw 101. This screw is mounted in a block 102 having a flange 103 which preferably is of non-circular construction and which is mounted in the sliding assembly. The block has a threaded opening 104 to receive the screw and adjustment of the fastener is effected by rotating the screw to an adjusted, fixed position to the block, as contrasted with varying the effective length of the draw bolt in the first embodiment.

The forward end of the block forms the retractable shear pin which is tapered as in the first embodiment. The contour of the draw bolt when viewed from the side is of importance. Because of the central, upwardly offset portion 106, when the latch is in fully locked position, the draw bolt will have a slight bending stress which is not objectionable and which becomes apparent when pivot 95 moves downwardly past center.

A pin 108 limits rearward travel of flange 103 and one end of a spring (not shown) passes through an opening 107 in the outer terminal section of head 98. Upstanding portions 109 serve as an abutment against which loop 96 may act if the block carrying the shear pin fails to retract under the influence of the spring.

The foregoing structure is the only change from that shown in the first embodiment. A cover 110 associated with the assisting lever is provided with a lock 111 similar to lock 81 of the first embodiment.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A latch fastener for drawing two bodies together and for securing them in rigid relationship against shear and tension loads, said fastener comprising two assembly units, one secured to each of said bodies, each assembly unit including a frame, a draw bolt mounted in one frame and provided at its outer end with an abutment, a shear pin assembly slidably mounted in the other frame and comprising a block and a shear pin extending forwardly therefrom, said shear pin having a longitudinal recess extending from end to end to receive the draw bolt and a detent at the inner end of the recess forming a seat for the abutment to draw the shear pin forwardly and lock the fastener, the major portion of the cross-sectional area of the draw bolt lying within the recess whereby the center line of the draw bolt coincides substantially with the center line of the shear pin when the parts are so locked, the forward ends of the frames being provided with the shear plates having aligned shear pin openings, and narrow slots leading from the openings through which the draw bolt passes, a draw bolt lever pivoted at one end in the first frame, a pivot connecting the inner end of the draw bolt with said lever between its ends, said lever being movable to a below center position with a toggle action to retain the shear pin in forward position.

2. A latch fastener for drawing two bodies together and for securing them in rigid relationship against shear and tension loads, said fastener comprising two assembly units, one secured to each of said bodies, each assembly unit including a frame, a draw bolt threaded at its outer end and carrying a nut, the draw bolt mounted in one frame, a shear pin assembly slidably mounted in the other frame and comprising a block and a shear pin extending forwardly therefrom, said shear pin having a longitudinal recess extending from end to end to receive the draw bolt and a detent at the inner end of the recess forming a seat for the nut to draw the shear pin forwardly and lock the fastener, the center line of the draw bolt coinciding substantially with the center line of the shear pin when the parts are so locked, the forward ends of the frames being provided with the shear plates having aligned shear pin openings, and narrow slots leading from the openings through which the draw bolt passes, a draw bolt lever pivoted at one end in the first frame, a pivot connecting the inner end of the draw bolt with said lever between its ends, said lever being movable to a below center position with a toggle action to retain the shear pin in forward position, a hand lever pivoted at the outer end of the draw bolt lever to increase the effective length of the latter, and releasable means for locking the two members together for conjoint movement so that the hand lever forms a rigid extension of the draw bolt lever.

3. A latch fastener for drawing two bodies together and for securing them in rigid relationship against shear and tension loads, said fastener comprising two assembly units, one secured to each of said bodies, each assembly unit including a frame, a draw bolt threaded at its out end and carrying a nut, the draw bolt mounted in one frame, a shear pin assembly slidably mounted in the other frame and comprising a block and a shear pin extending forwardly therefrom, said shear pin having a longitudinal recess extending from end to end to receive the draw bolt and a detent at the inner end of the recess forming a seat for the nut to draw the shear pin forwardly and lock the fastener, the center line of the draw bolt coinciding substantially with the center line of the shear pin when the parts are so locked, the forward ends of the frames being provided with the shear plates having aligned shear pin openings, and narrow slots leading from the openings through which the draw bolt passes, a draw bolt lever pivoted at one end in the first frame, a pivot connecting the inner end of the draw bolt with said lever between its ends, said lever being movable to a below center position with a toggle action to retain the shear pin in forward position, a hand lever pivoted at the outer end of the draw bolt lever to increase the effective length of the latter, a spring urging the hand lever outwardly to a position at greater than a right angle to the plane of the draw bolt lever, releasable means connecting the levers for conjoint movement so that the hand lever forms a rigid extension of the draw bolt lever, and a lock for retaining the hand lever in closed position.

References Cited in the file of this patent

UNITED STATES PATENTS

| Number | Name | Date |
|---|---|---|
| 1,024,054 | Barnes | Apr. 23, 1912 |

FOREIGN PATENTS

| Number | Country | Date |
|---|---|---|
| 265,711 | Germany | Apr. 11, 1913 |
| 633,301 | Great Britain | Dec. 12, 1949 |